(12) United States Patent
Cho et al.

(10) Patent No.: US 11,901,540 B2
(45) Date of Patent: Feb. 13, 2024

(54) COMPOSITE ANODE ACTIVE MATERIAL, METHOD OF PREPARING THE SAME, AND LITHIUM SECONDARY BATTERY INCLUDING ANODE INCLUDING COMPOSITE ANODE ACTIVE MATERIAL

(71) Applicant: UNIST(ULSAN NATIONAL INSTITUTE OF SCIENCE AND TECHNOLOGY), Ulsan (KR)

(72) Inventors: Jae Phil Cho, Ulsan (KR); Yeong Uk Son, Ulsan (KR); Ji Young Ma, Ulsan (KR); Nam Hyung Kim, Ulsan (KR)

(73) Assignee: UNIST(ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 331 days.

(21) Appl. No.: 17/204,707

(22) Filed: Mar. 17, 2021

(65) Prior Publication Data

US 2021/0202944 A1    Jul. 1, 2021

Related U.S. Application Data

(62) Division of application No. 16/036,761, filed on Jul. 16, 2018, now Pat. No. 10,985,370.

(30) Foreign Application Priority Data

Jul. 28, 2017  (KR) .................. 10-2017-0096382
Jun. 4, 2018   (KR) .................. 10-2018-0064476

(51) Int. Cl.
*H01M 4/04*     (2006.01)
*H01M 4/133*    (2010.01)
(Continued)

(52) U.S. Cl.
CPC ....... *H01M 4/0419* (2013.01); *H01M 4/0471* (2013.01); *H01M 4/0492* (2013.01); *H01M 4/133* (2013.01); *H01M 4/134* (2013.01); *H01M 4/1393* (2013.01); *H01M 4/1395* (2013.01); *H01M 4/366* (2013.01); *H01M 4/386* (2013.01); *H01M 4/587* (2013.01); *C01B 32/184* (2017.08); *H01M 4/364* (2013.01); *H01M 4/583* (2013.01);
(Continued)

(58) Field of Classification Search
None
See application file for complete search history.

(56) References Cited

U.S. PATENT DOCUMENTS 9,905,842 B2    2/2018  Kim et al.
2006/0134516 A1 6/2006  Im et al.
(Continued)

FOREIGN PATENT DOCUMENTS

| KR | 10-2013-0056668 A | 5/2013 |
| KR | 10-2014-0022682 A | 2/2014 |
| KR | 10-1665099 B1 | 10/2016 |

OTHER PUBLICATIONS

Office Action for Korean Patent Application No. 10-2018-0064476, dated Sep. 3, 2019 (w/English translation).

*Primary Examiner* — Laura Weiner
(74) *Attorney, Agent, or Firm* — Klarquist Sparkman, LLP

(57) ABSTRACT

Provided herein is a composite anode active material including: a porous carbon structure; a first coating layer on the porous carbon structure and including a non-carbonaceous material capable of intercalating and deintercalating lithium; and a second coating layer on the first coating layer and including a carbonaceous material.

7 Claims, 23 Drawing Sheets

(51) Int. Cl.
*H01M 4/134* (2010.01)
*H01M 4/36* (2006.01)
*H01M 4/587* (2010.01)
*H01M 4/38* (2006.01)
*H01M 4/1393* (2010.01)
*H01M 4/1395* (2010.01)
H01M 4/583 (2010.01)
H01M 10/0525 (2010.01)
H01M 4/62 (2006.01)
H01M 4/02 (2006.01)
H01M 4/66 (2006.01)
C01B 32/184 (2017.01)
H01M 50/44 (2021.01)

(52) U.S. Cl.
CPC ............ *H01M 4/623* (2013.01); *H01M 4/661* (2013.01); *H01M 10/0525* (2013.01); *H01M 50/44* (2021.01); *H01M 2004/028* (2013.01)

(56) References Cited

U.S. PATENT DOCUMENTS

| | | |
|---|---|---|
| 2013/0130115 A1 | 5/2013 | Park et al. |
| 2014/0050983 A1 | 2/2014 | Kim et al. |
| 2020/0266444 A1 | 8/2020 | Kim et al. |

COMPOSITE ANODE ACTIVE MATERIAL, METHOD OF PREPARING THE SAME, AND LITHIUM SECONDARY BATTERY INCLUDING ANODE INCLUDING COMPOSITE ANODE ACTIVE MATERIAL

CROSS-REFERENCE TO RELATED APPLICATIONS

This application is a divisional of U.S. patent application Ser. No. 16/036,761, filed Jul. 16, 2018, issued as U.S. Pat. No. 10,985,370 B2, which claims the benefit of Korean Patent Application Nos. 10-2017-0096382, filed on Jul. 28, 2017 and 10-2018-0064476, filed on Jun. 4, 2018, in the Korean Intellectual Property Office, the disclosures of which are incorporated herein in their entirety by reference.

BACKGROUND

1. Field

One or more embodiments relate to a composite anode active material, and an anode and a lithium battery each including the same.

2. Description of the Related Art

Lithium batteries have high voltage and high energy density, and thus are used in various applications. For example, lithium batteries with excellent discharge capacity and lifespan characteristics are required for application in, for example, electric vehicles (e.g., hybrid electric vehicles (HEVs) and plug-in HEVs (PHEVs)) which can be operated at a high temperature, must be charged or discharged with a large amount of electricity, and must be used for a long period of time.

Carbonaceous materials are porous and undergo small volumetric changes during charging and discharging, and thus are stable. However, carbonaceous materials generally exhibit low battery capacity due to having a porous carbon structure. For example, when graphite, which is a highly crystalline material, is formed as $LiC_6$, it has a theoretical capacity of 372 mAh/g. In addition, this graphite has poor high-rate characteristics.

Anode active materials that have electric capacities higher than those of such carbonaceous materials may be metals alloyable with lithium. Non-limiting examples of the metals alloyable with lithium include silicon (Si), tin (Sn), and aluminum (Al). Such metals alloyable with lithium have high discharge capacities, but easily deteriorate since they undergo large volumetric changes thereof during charging and discharging, resulting in deteriorated lifespan characteristics.

To address these issues, a variety of research has been conducted on silicon-carbon based composites, in which a carbon-based material which acts as a matrix for volumetric expansion and contributes to improvement in electrical conductivity is applied to silicon.

Existing silicon-carbon based composites use carbon nanotubes as a carbonaceous material to increase the content of silicon, but these have safety concerns due to the use of hydrofluoric acid in the preparation process. In addition, these existing silicon-carbon based composites are still problematic in that it is difficult to increase capacity up to 800 mAh/g or more due to limited silicon content.

Therefore, there is a need for a composite anode active material for a lithium battery which is simple and safe, suppresses a change in volume of the metal alloyable with lithium without a decrease in initial efficiency, achieves high capacity, and exhibits enhanced lifespan characteristics, and a method of preparing the same.

SUMMARY

One or more embodiments include a composite anode active material.

One or more embodiments include a method of preparing the above-described composite anode active material.

One or more embodiments include a lithium secondary battery including an anode including the above-described composite anode active material.

Additional aspects will be set forth in part in the description which follows and, in part, will be apparent from the description, or may be learned by practice of the presented embodiments.

According to one or more embodiments, a composite anode active material includes a porous carbon structure; a first coating layer on the porous carbon structure and including a non-carbonaceous material capable of intercalating and deintercalating lithium; and a second coating layer on the first coating layer and including a carbonaceous material.

According to one or more embodiments, a method of preparing a composite anode active material includes spray-drying a solution including a carbon source and a pore-forming agent to obtain a composite structure; etching the composite structure to form a porous composite structure; providing a non-carbonaceous material to the porous composite structure to form a first coating layer on a surface of the porous composite structure; and providing a carbon precursor to the first coating layer to form a second coating layer on the first coating layer arranged on the surface of the porous composite structure.

According to one or more embodiments, a lithium secondary battery includes an anode including the above-described composite anode active material.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
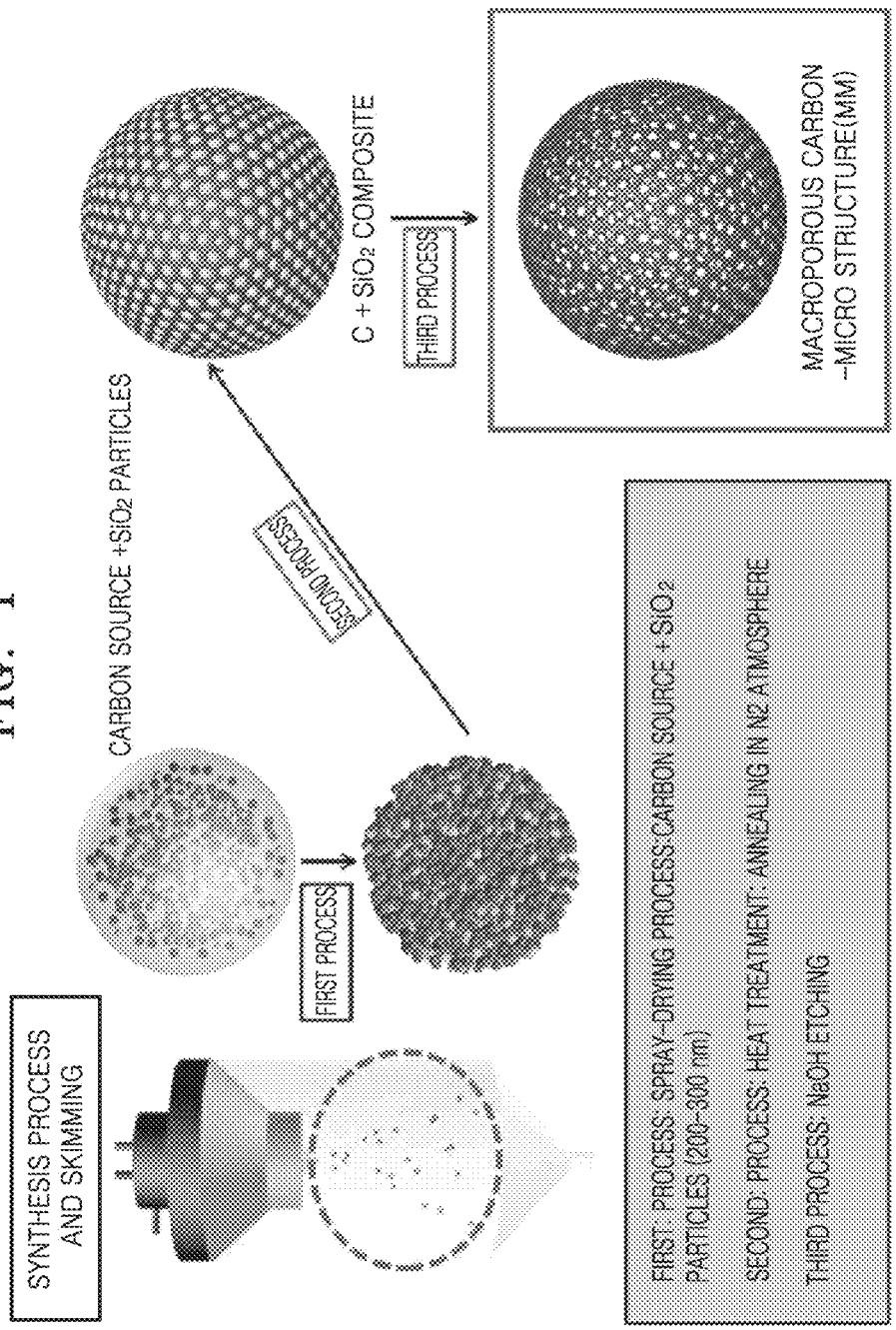
FIG. 1 is a schematic diagram of a porous carbon synthesis method.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Hereinafter, a composite anode active material according to example embodiments, a method of preparing the same, and a lithium secondary battery including an anode including the composite anode active material will be described in more detail.

A composite anode active material according to an embodiment may include: a porous carbon structure; a first coating layer on the porous carbon structure and including a non-carbonaceous material capable of intercalating and deintercalating lithium; and a second coating layer on the first coating layer and including a carbonaceous material.

The porous carbon structure has a plurality of pores, and thus has a greater surface area than that of a carbon structure having the same volume. Accordingly, a larger amount of non-carbonaceous material may be included in the first coating layer arranged on the porous carbon structure without an increase in thickness of the coating layer.

In addition, the porous carbon structure has pores therein, and thus may act as a buffer for expansion of the composite anode active material during charging and discharging.

The porous carbon structure may provide enhanced conductivity and the pores thereof may accommodate a volumetric change of a non-carbonaceous material of a charge/discharge cell, and thus a lithium secondary battery including the composite anode active material may have enhanced initial efficiency, enhanced discharge capacity, and enhanced lifespan characteristics.

In the composite anode active material, the porous carbon structure may have a median diameter ($d_{50}$) of about 1 μm to about 40 μm. For example, the median diameter ($d_{50}$) of the porous carbon structure may range from about 1 μm to about 30 μm. For example, the median diameter ($d_{50}$) of the porous carbon structure may range from about 1 μm to about 20 μm. For example, the median diameter ($d_{50}$) of the porous carbon structure may range from about 1 μm to about 10 μm. When the median diameter ($d_{50}$) is too small, it may be difficult to prepare an active material slurry and coat an electrode plate therewith. When the median diameter ($d_{50}$) is too large, the coating layer may be not uniform or rate capability may deteriorate.

In the composite anode active material, the porous carbon structure may be a spherical or oval structure having an aspect ratio of 2 or less. For example, the porous carbon structure may be spherical. Since the particles have a spherical shape, it may be suitable for use in dispersion in a slurry and the strength of an electrode plate may be enhanced.

In the composite anode active material, the porous carbon structure may have nanometer-sized pores. For example, the porous carbon structure may have pores having an average pore diameter of about 100 nm to about 400 nm. For example, the porous carbon structure may have pores having an average pore diameter of about 200 nm to about 300 nm.

The porous carbon structure may have pores with an irregular form. That is, the porous carbon structure may have pores having a circular or polygonal sectional shape, or a combination thereof, but the present disclosure is not limited to the above examples.

For example, cut surfaces of the particles may have non-spherical pores. The non-spherical pores may be tube-type pores having an aspect ratio of 3 or more.

In the composite anode active material, the non-carbonaceous material capable of intercalating and deintercalating lithium may include at least one metal selected from silicon (Si), tin (Sn), aluminum (Al), germanium (Ge), lead (Pb), zinc (Zn), silver (Ag), and gold (Au); an alloy, oxide, nitride, or oxynitride thereof; or a combination thereof.

According to one embodiment, the non-carbonaceous material may be Si. For example, the non-carbonaceous material may be amorphous Si, crystalline Si, or a mixture thereof. The amorphous Si has less stress from structural changes compared to crystalline Si, and thus provides enhanced charge/discharge characteristics.

In the composite anode active material, the first coating layer may cover at least a portion of a surface of the porous carbon structure. For example, the first coating layer may completely cover the surface of the porous carbon structure. The surface of the porous carbon structure includes a surface extending inward of the porous carbon structure via the pores.

According to one embodiment, the first coating layer may uniformly cover the surface of the porous carbon structure. For example, the first coating layer may have a constant thickness from the surface of the porous carbon structure.

In the composite anode active material, the first coating layer may have a thickness of about 5 nm to about 100 nm. For example, the thickness of the first coating layer may range from about 5 nm to about 90 nm. For example, the thickness of the first coating layer may range from about 5 nm to about 80 nm. For example, the thickness of the first coating layer may range from about 5 nm to about 70 nm. For example, the thickness of the first coating layer may range from about 5 nm to about 60 nm. For example, the thickness of the first coating layer may range from about 5 nm to about 50 nm. For example, the thickness of the first coating layer may range from about 5 nm to about 40 nm. For example, the thickness of the first coating layer may range from about 5 nm to about 30 nm. For example, the thickness of the first coating layer may range from about 5 nm to about 20 nm. For example, the thickness of the first coating layer may range from about 5 nm to about 10 nm. When the thickness of the first coating layer is too large, cracks may occur in the active material due to a volumetric change of the non-carbonaceous material during charging and discharging, and when the thickness of the first coating layer is too small, it is impossible to obtain sufficient capacity.

Generally, as the thickness of the first coating layer increases, the amount of the non-carbonaceous material capable of intercalating and deintercalating lithium increases, and as a result, the capacity of the composite anode active material may be increased. However, cracks may occur in the coating layer according to an increase in volumetric change of the coating layer during charging and discharging, and therefore, the thickness of the coating layer may be appropriately adjusted such that a maximum capacity is obtained within a range that does not deteriorate lifespan characteristics.

In addition, in the composite anode active material, the porous carbon structure has a large surface area due to a plurality of pores thereof, and thus assuming that the formed coating layers have the same thickness, a coating layer including a larger amount of non-carbonaceous material may be formed compared to a general composite anode active material including a coating layer on a carbon material, and accordingly, capacity may be increased within a range that does not deteriorate lifespan characteristics.

In some embodiments, assuming that the amounts of non-carbonaceous materials are identical to each other, a thinner coating layer may be formed compared to a general composite anode active material including a coating layer on a carbon material, and thus a volumetric change thereof may be reduced. Accordingly, lifespan characteristics may be significantly enhanced at the same capacity.

The amount of the non-carbonaceous material capable of intercalating and deintercalating lithium in the composite anode active material may range from about 1 wt % to about 80 wt % with respect to a total weight of the composite anode active material. For example, the amount of the non-carbonaceous material may range from about 1 wt % to about 75 wt % with respect to the total weight of the composite anode active material. For example, the amount of the non-carbonaceous material may range from about 1 wt % to about 70 wt % with respect to the total weight of the composite anode active material. For example, the amount of the non-carbonaceous material may range from about 1 wt % to about 65 wt % with respect to the total weight of the composite anode active material. For example, the amount of the non-carbonaceous material may range from about 1 wt % to about 60 wt % with respect to the total weight of the composite anode active material. For example, the amount of the non-carbonaceous material may range from about 1 wt % to about 55 wt % with respect to the total weight of the composite anode active material. For example, the amount of the non-carbonaceous material may range from about 1 wt % to about 50 wt % with respect to the total weight of the composite anode active material. For example, the amount of the non-carbonaceous material may range from about 1 wt % to about 45 wt % with respect to the total weight of the composite anode active material. For example, the amount of the non-carbonaceous material may range from about 1 wt % to about 40 wt % with respect to the total weight of the composite anode active material. For example, the amount of the non-carbonaceous material may range from about 1 wt % to about 35 wt % with respect to the total weight of the composite anode active material. For example, the amount of the non-carbonaceous material may range from about 1 wt % to about 30 wt % with respect to the total weight of the composite anode active material. For example, the amount of the non-carbonaceous material may range from about 1 wt % to about 25 wt % with respect to the total weight of the composite anode active material. For example, the amount of the non-carbonaceous material may range from about 1 wt % to about 20 wt % with respect to the total weight of the composite anode active material. For example, the amount of the non-carbonaceous material may range from about 1 wt % to about 15 wt % with respect to the total weight of the composite anode active material. For example, the amount of the non-carbonaceous material may range from about 1 wt % to about 10 wt % with respect to the total weight of the composite anode active material. When the amount of the non-carbonaceous material capable of intercalating and deintercalating lithium is too large, cracks may occur in the active material due to a change in volume of the non-carbonaceous material during charging and discharging.

In the composite anode active material, the first coating layer may have a curved portion. For example, the first coating layer may be partially or completely formed on a surface of the porous carbon structure and surfaces of pores extending from the surface to the inside of the porous carbon structure. For example, the first coating layer may be formed around the surfaces of the pores of the porous carbon structure. For example, the first coating layer is formed as a continuous coating layer on the surfaces of the pores extending from the surface of the porous carbon structure to the inside of the porous carbon structure, and thus at least a portion of the coating layer may have a curved portion. Since the first coating layer has a curved portion, it is possible for the volume thereof to radially expand, and thus the first coating layer has an excellent volume expansion buffer effect compared to a planar coating layer, the volume of which expands in one direction.

In the composite anode active material, the carbonaceous material included in the first coating layer may include a crystalline or amorphous carbonaceous material.

In the composite anode active material, the carbonaceous material may be a calcined product of a carbon precursor. The carbon precursor may be any carbonaceous material that may be used in the art and is obtained by calcination.

The carbon precursor may include at least one selected from rayon-based carbon fibers, PAN-based carbon fibers, pitch-based carbon fibers, vapor-grown carbon, carbon fibers, graphite, a polymer, coal tar pitch, petroleum pitch, meso-phase pitch, an isotropic pitch, cokes, low molecular weight heavy oil, a coal-based pitch, phenol resin, naphthalene resin, epoxy resin, vinyl chloride resin, polyimide, polybenzimidazole, polyacrylonitrile, polyethylene glycol, polyvinyl alcohol, polyvinyl chloride, furfuryl alcohol, furan, cellulose, glucose, sucrose, acetic acid, malic acid, citric acid, an organic acid, and a derivative thereof, but the present disclosure is not limited to the above examples.

For example, the second coating layer may be formed from a carbon precursor selected from rayon-based carbon fibers, PAN-based carbon fibers, pitch-based carbon fibers, vapor-grown carbon, and a combination thereof.

In the composite anode active material, the second coating layer may have a thickness of about 0.1 nm to about 100 nm. For example, the thickness of the second coating layer may range from about 0.1 nm to about 90 nm. For example, the thickness of the second coating layer may range from about 0.1 nm to about 80 nm. For example, the thickness of the second coating layer may range from about 0.1 nm to about 70 nm. For example, the thickness of the second coating layer may range from about 0.1 nm to about 60 nm. For example, the thickness of the second coating layer may range from about 0.1 nm to about 50 nm. For example, the thickness of the second coating layer may range from about 0.1 nm to about 40 nm. For example, the thickness of the second coating layer may range from about 0.1 nm to about 30 nm. For example, the thickness of the second coating layer may range from about 0.1 nm to about 20 nm. For example, the thickness of the second coating layer may range from about 0.1 nm to about 10 nm. The second coating layer forms a solid electrolyte interface (SEI) during charging and discharging, and $Li^+$ ions selectively pass through the SEI, thereby preventing contact of the porous carbon structure and the non-carbonaceous material with an electrolytic solution or the like. As a result, the composite anode active material may exhibit enhanced durability.

Hereinafter, a method of preparing the above-described composite anode active material will be described.

According to an embodiment, a method of preparing the composite anode active material may include:
(a) spray-drying a solution including a carbon source and a pore-forming agent to obtain a composite structure;
(b) etching the composite structure to form a porous composite structure;
(c) providing a non-carbonaceous material to the porous composite structure to form a first coating layer on a surface of the porous composite structure; and
(d) providing a carbon precursor to the first coating layer to form a second coating layer on the first coating layer arranged on the surface of the porous composite structure.

The carbon source may be easily selected by one of ordinary skill in the art from carbon sources used in the art that are capable of forming a carbon structure by calcination.

For example, the carbon source may be at least one selected from rayon-based carbon fibers, PAN-based carbon fibers, pitch-based carbon fibers, vapor-grown carbon, carbon fibers, graphite, a polymer, coal tar pitch, petroleum pitch, meso-phase pitch, an isotropic pitch, cokes, low molecular weight heavy oil, a coal-based pitch, phenol resin, naphthalene resin, epoxy resin, vinyl chloride resin, polyimide, polybenzimidazole, polyacrylonitrile, polyethylene glycol, polyvinyl alcohol, polyvinyl chloride, furfuryl alcohol, furan, cellulose, glucose, sucrose, acetic acid, malic acid, citric acid, an organic acid, and a derivative thereof.

The pore-forming agent may be a silicon oxide.

The carbon source and the pore-forming agent may be dissolved in tetrahydrofuran (THF). The solution may further include a dispersant that enables the pore-forming agent to be uniformly dispersed therein.

After the spray-drying and before the etching process, sintering the composite structure in a nitrogen atmosphere may be further performed.

The sintering process may be performed at 800° C. or more. For example, the sintering process may be performed at 900° C. or more. For example, the sintering process may be performed at 1,000° C. or more.

In the etching process, a silicon oxide may be removed by etching from the composite structure by immersing the composite structure in a sodium hydroxide (NaOH) solution. As a result, pores may be formed in a position from which the silicon oxide has been removed. Sodium hydroxide is easily handled and safe, thus simplifying the preparation process, compared to a case in which hydrofluoric acid is used as an etchant.

In the process of providing a non-carbonaceous material to the porous composite structure, the non-carbonaceous material may be a silane-based gas. The non-carbonaceous material may be easily selected by one of ordinary skill in the art from non-carbonaceous materials used in the art that are capable of releasing Si atoms by gasification.

For example, the non-carbonaceous material may be a silicon-based precursor, for example, silane ($SiH_4$), dichlorosilane ($SiH_2Cl_2$), silicon tetrafluoride ($SiF_4$), silicon tetrachloride ($SiCl_4$), methylsilane ($CH_3SiH_3$), disilane ($Si_2H_6$), or a combination thereof.

In the process of providing a carbon precursor to the first coating layer, the carbon precursor may be a petroleum-based pitch, a coal-based pitch, polyimide, polybenzimidazole, polyacrylonitrile, meso-phase pitch, furfuryl alcohol, furan, cellulose, sucrose, polyvinyl chloride, or a mixture thereof.

The first coating layer and the second coating layer may be formed by chemical vapor deposition (CVD) in an inert gas atmosphere. The inert gas atmosphere is not particularly limited, but may be an argon (Ar) or nitrogen ($N_2$) atmosphere.

The process of providing a non-carbonaceous material to the porous composite structure may include performing heat treatment at a temperature ranging from about 450° C. to about 600° C. For example, the process may include performing heat treatment at a temperature ranging from about 450° C. to about 500° C. The heat treatment process may be performed for about 1 minute to about 10 hours, for example, about 1 minute to about 5 hours, for example, about 1 minute to about 3 hours, for example, about 1 minute to about 1 hour, for example, about 1 minute to about 30 minutes.

The process of providing a carbon precursor to the first coating layer may include performing heat treatment at a temperature ranging from 700° C. to about 900° C. For example, the process may include performing heat treatment at a temperature ranging from about 750° C. to about 850° C. The heat treatment process may be performed for about 1 minute to about 10 hours, for example, about 1 minute to about 5 hours, for example, about 1 minute to about 3 hours, for example, about 1 minute to about 1 hour, for example, about 1 minute to about 30 minutes.

An anode for a lithium battery, according to another embodiment includes: an anode current collector; and an anode active material layer on at least a surface of the anode current collector and including the above-described composite anode active material.

The anode may include a binder between the anode current collector and the anode active material layer or in the anode active material layer. The binder will be described below.

The anode and a lithium battery including the anode may be manufactured using the following methods.

The anode includes the above-described composite anode active material, and, for example, may be fabricated by preparing a composite anode active material composition by mixing the above-described composite anode active material, a binder, and optionally a conductive material in a solvent, and then molding the composite anode active material composition into a certain shape, or applying the composite anode active material composition to a current collector such as copper foil or the like.

The binder used in the composite anode active material composition is a component assisting in binding between a composite anode active material and a conductive agent and in binding of the active material to a current collector, may be included between the anode current collector and the anode active material layer or in the anode active material layer, and may be added in an amount of about 1 part by weight to about 50 parts by weight based on 100 parts by weight of the composite anode active material. For example, the binder may be added in an amount of about 1 part by weight to about 30 parts by weight, about 1 part by weight to about 20 parts by weight, or about 1 part by weight to about 15 parts by weight, with respect to 100 parts by weight of the composite anode active material. Non-limiting examples of the binder include polyvinylidene fluoride, polyvinylidene chloride, polybenzimidazole, polyimide, polyvinyl acetate, polyacrylonitrile, polyvinyl alcohol, carboxymethylcellulose (CMC), starch, hydroxypropylcellulose, regenerated cellulose, polyvinyl pyrrolidone, tetrafluoroethylene, polyethylene, polypropylene, polystyrene, polymethylmethacrylate, polyaniline, acrylonitrile butadiene styrene, phenol resin, epoxy resin, polyethyleneterephthalate, polytetrafluoroethylene, polyphenylene sulfide, polyamideimide, polyetherimide, polyethersulfone, polyamide, polyacetal, polyphenyleneoxide, polybutyleneterephthalate, ethylene-propylene-diene terpolymer (EPDM), sulfonated EPDM, styrene-butadiene rubber (SBR), fluorine rubber, and various copolymers.

The anode may further include optionally a conductive material that provides a conductive path for the above-described composite anode active material to further enhance electrical conductivity. The conductive material may be any conductive material that may be generally used in lithium batteries, and may be, for example, a conductive material including: a carbonaceous material such as carbon black, acetylene black, Ketjen black, carbon fibers (e.g., vapor-grown carbon fibers), or the like; a metal-based material such as metal powder, metal fibers, or the like, which is formed of copper, nickel, aluminum, silver, or the like; a conductive polymer such as polyphenylene derivatives or the like; or a mixture thereof. The amount of the conductive material may be appropriately adjusted. For example, the conductive material may be added such that a weight ratio of the composite anode active material to the conductive material ranges from about 99:1 to about 90:10.

The solvent may be N-methylpyrrolidone (NMP), acetone, water, or the like. The solvent is used in an amount of about 1 part by weight to about 10 parts by weight with respect to 100 parts by weight of the composite anode active material. When the amount of the solvent is within the above range, an operation for forming an active material layer is easy.

In addition, the current collector is generally fabricated to a thickness of 3 μm to 500 μm. The current collector is not particularly limited so long as it does not cause a chemical change in the fabricated battery and has conductivity. Examples of a material for forming the current collector include copper, stainless steel, aluminum, nickel, titanium, calcined carbon, copper or stainless steel that is surface-treated with carbon, nickel, titanium, silver, or the like, an alloy of aluminum and cadmium, or the like. In addition, the current collector may have fine irregularities on a surface thereof so as to enhance adhesion between the composite anode active material and the current collector, and may be used in any of various forms including a film, a sheet, a foil, a net, a porous structure, a foam, a non-woven fabric, and the like.

The prepared composite anode active material composition may be directly coated onto a current collector to fabricate an anode plate, or may be cast onto a separate support and a composite anode active material film separated from the support is laminated on a copper foil current collector, to obtain an anode plate. However, the anode is not limited to the above-listed shapes and may have other shapes.

The composite anode active material composition may be used in manufacturing an electrode of a lithium battery, and may also be used to manufacture a printable battery by printing the composite anode active material composition on a flexible electrode substrate.

Next, a separator is prepared.

The separator may be any separator commonly used in lithium batteries. The separator may have low resistance to migration of ions in an electrolyte and have an excellent electrolyte-retaining ability. Examples of the separator include glass fiber, polyester, Teflon, polyethylene, polypropylene, polytetrafluoroethylene (PTFE), and combinations thereof, each of which may be a non-woven or woven fabric. For example, a rollable separator including polyethylene, polypropylene, or the like may be used for a lithium ion battery, and a separator with an excellent organic electrolytic solution-retaining ability may be used for a lithium ion polymer battery. For example, the separator may be manufactured using the following method.

A polymer resin, a filler, and a solvent are mixed together to prepare a separator composition. Then, the separator composition may be directly coated on an electrode, and then dried to fabricate the separator. In some embodiments, the separator composition may be cast on a support and then dried, and then a separator film separated from the support may be laminated on an electrode, thereby completing the fabrication of a separator.

The polymer resin used to manufacture the separator is not particularly limited and may be any material commonly used as a binder for electrode plates. For example, the polymer resin may be a vinylidenefluoride/hexafluoropropylene copolymer, polyvinylidene fluoride (PVDF), polyacrylonitrile, polymethylmethacrylate, a mixture thereof, or the like.

Next, an electrolyte may be a lithium salt-containing non-aqueous electrolyte.

The lithium salt-containing non-aqueous electrolyte may include a non-aqueous electrolytic solution and a lithium salt. As the non-aqueous electrolyte, a non-aqueous electrolytic solution, a solid electrolyte, an inorganic solid electrolyte, or the like is used.

The non-aqueous electrolytic solution may be, for example, an aprotic organic solvent such as N-methyl-2-pyrrolidone, propylene carbonate, ethylene carbonate, butylene carbonate, dimethyl carbonate, diethyl carbonate, fluorinated ethylene carbonate, ethylene methylene carbonate, methyl propyl carbonate, ethyl propanoate, methyl acetate, ethyl acetate, propyl acetate, dimethyl ester, γ-butyrolactone, 1,2-dimethoxy ethane, tetrahydrofuran, 2-methyltetrahydrofuran, dimethylsulfoxide, 1,3-dioxolane, formamide, dimethylformamide, dioxolane, acetonitrile, nitromethane, methyl formate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Non-limiting examples of the organic solid electrolyte may include polyethylene derivatives, polyethylene oxide derivatives, polypropylene oxide derivatives, phosphoric acid ester polymers, polyester sulfide, polyvinyl alcohols, polyvinylidene fluoride, and polymers containing ionic dissociation groups.

Non-limiting examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt may be any lithium salt commonly used in lithium batteries which is a material readily soluble in the non-aqueous electrolyte. The lithium salt may be, for example, at least one selected from LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic carboxylic acid lithium, lithium tetraphenyl borate, and imides.

Lithium batteries may be classified as lithium-ion batteries, lithium-ion polymer batteries, and lithium polymer batteries according to the types of separator and electrolyte included therein. In addition, lithium batteries may be classified as cylindrical, rectangular, coin-type, and pouch-type batteries according to a shape thereof, and as bulk-type and thin-film-type according to a size thereof. In addition, the lithium battery may include both a lithium primary battery and a lithium secondary battery.

The lithium battery includes a cathode, an anode, and a separator arranged between the cathode and the anode. The cathode, the anode, and the separator are wound or folded to be accommodated in a battery case. Subsequently, an electrolyte is injected into the battery case, followed by sealing with a sealing member, thereby completing the manufacture of a lithium battery. The battery case may be a cylindrical type, a rectangular type, a thin-film type, or the like. For example, the lithium battery may be a lithium ion battery.

The lithium battery may be classified as a winding type and a stack type according to the type of an electrode, and may be classified as a cylindrical lithium battery, a rectangular lithium battery, a coin-type lithium battery, and a pouch-type lithium battery according to the type of an exterior material.

Methods of manufacturing these batteries are well known in the art, and thus detailed descriptions thereof will not be provided herein.

The lithium battery may be used in batteries used as power sources of small-scale devices and may also be used as a unit cell in battery modules of medium- and large-scale devices including a plurality of batteries.

Non-limiting examples of the medium- and large-scale devices include power tools; electric vehicles (EVs), hybrid EVs (HEVs), plug-in HEVs (PHEVs); electric two-wheel vehicles including E-bikes and E-scooters; electric golf carts; electric trucks; electric commercial vehicles; and power storage devices. In addition, the lithium battery may be used for other applications that require high output, high voltage, and high-temperature operation.

Hereinafter, example embodiments will be described in further detail with reference to the following examples and comparative examples. However, these examples are provided for illustrative purposes only and are not intended to limit the scope of the present disclosure.

(Preparation of Porous Carbon Composite)

Preparation Example 1

Pitch and powder-type $SiO_2$ nanoparticles having an average diameter of 200 nm were dissolved in a weight ratio of 1:4 in THF and stirred to obtain a mixture. The mixture was spray-dried, heat-treated in an oxygen atmosphere while being maintained at 300° C. for 3 hours, heat-treated in a nitrogen atmosphere while being maintained at 900° C. for 1 hour, and then carbonized to thereby obtain a carbon-silicon oxide ($SiO_2$) composite. The composite was immersed in a 5 M NaOH solution and etched for 24 hours, thereby completing the preparation of a porous carbon structure having an average pore diameter of 200 nm.

Figure 2A:
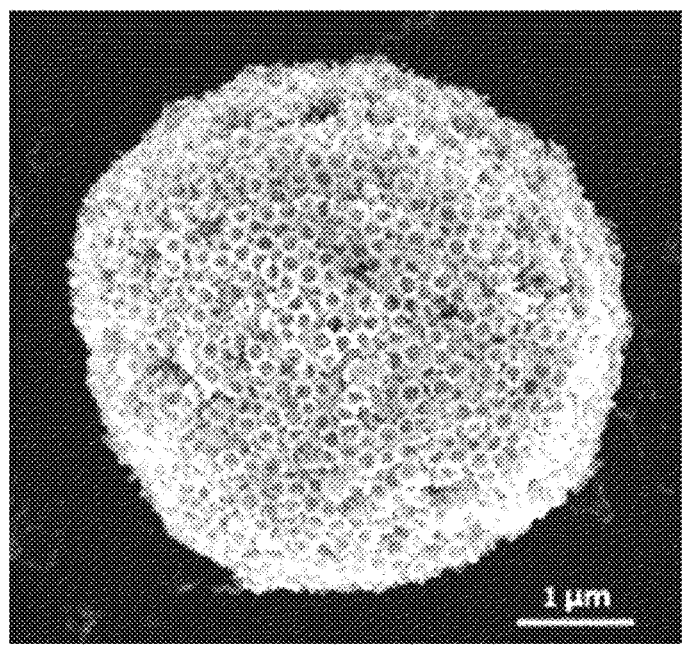
FIG. 2A is a scanning electron microscope (SEM) image of a porous carbon particle prepared according to Preparation Example 1.
Figure 2B:
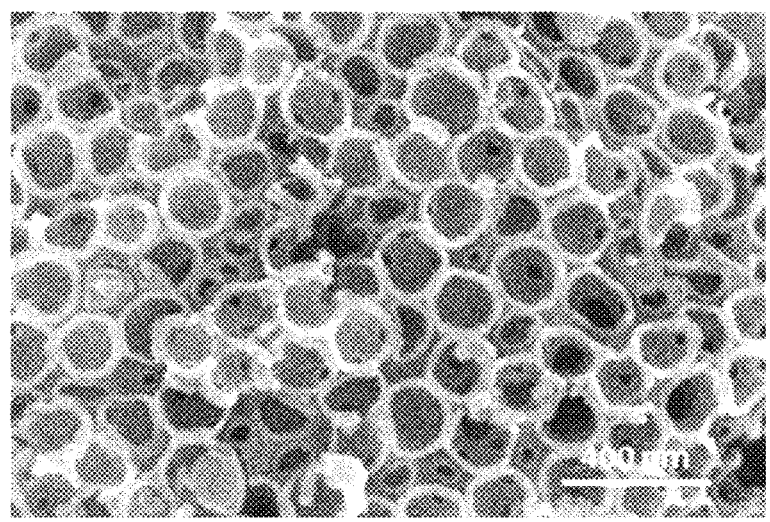
FIG. 2B is an enlarged view of FIG. 2A.
Figure 2C:
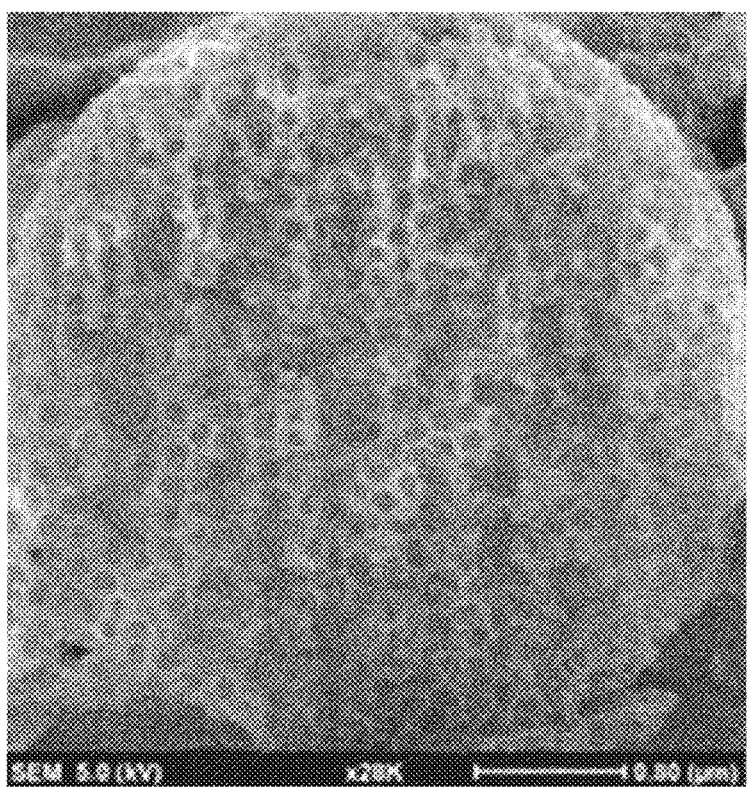
FIG. 2C is an SEM image of a cross-section of the porous carbon particle of Preparation Example 1.

Scanning electron microscope (SEM) images of the prepared porous carbon structure are shown in FIGS. 2A to 2C.

(Preparation of Silicon-Porous Carbon Composite)

Preparation Example 2-1

1 g of the porous carbon structure prepared according to Preparation Example 1 was subjected to chemical deposition of $SiH_4$ (g) at 475° C. and at a rate of 50 sccm for 15 minutes to prepare a silicon-porous carbon composite.

Figure 3A:
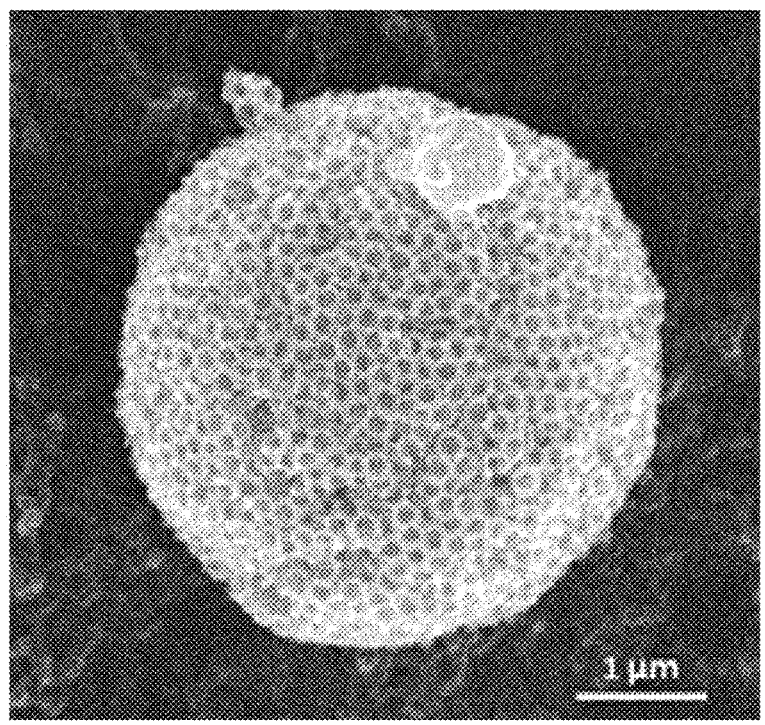
FIG. 3A is an SEM image of a silicon-porous carbon composite prepared according to Preparation Example 2-1.
Figure 3B:
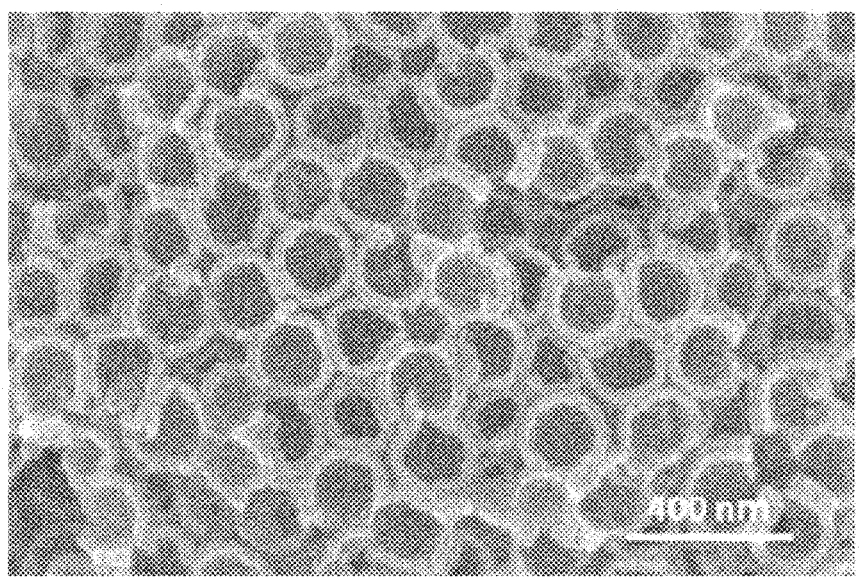
FIG. 3B is an enlarged view of FIG. 3A.
Figure 3C:
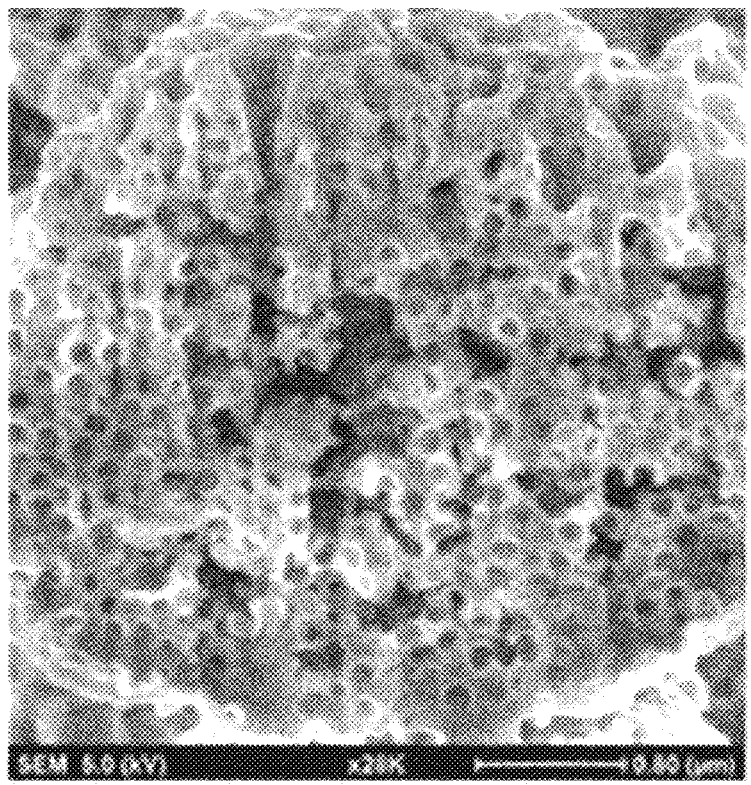
FIG. 3C is an SEM image of a cross-section of the silicon-porous carbon composite prepared according to Preparation Example 2-1.

SEM images of the prepared silicon-porous carbon composite are shown in FIGS. 3A to 3C.

Preparation Example 2-2 (SMM600)

1 g of the porous carbon structure of Preparation Example 1 was subjected to chemical deposition of $SiH_4$ (g) at 475° C. and at a rate of 50 sccm for 6 minutes to prepare a silicon-porous carbon composite.

Figure 3D:
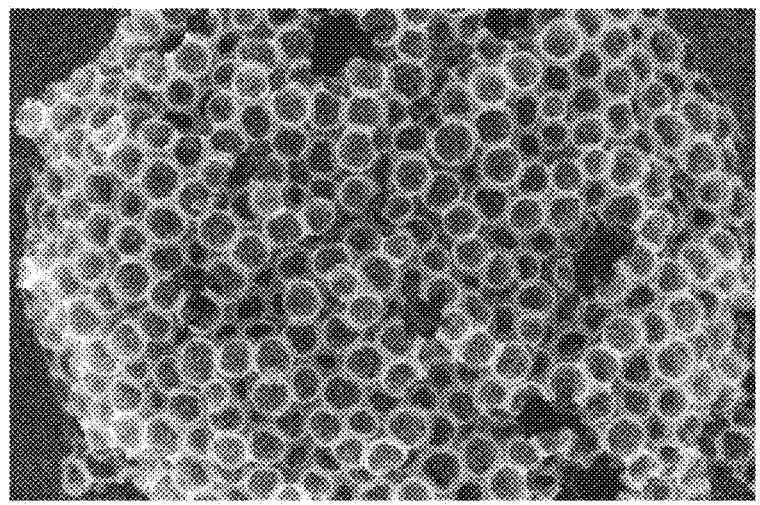
FIG. 3D is an SEM image of a silicon-porous carbon composite prepared according to Preparation Example 2-2.
Figure 3E:
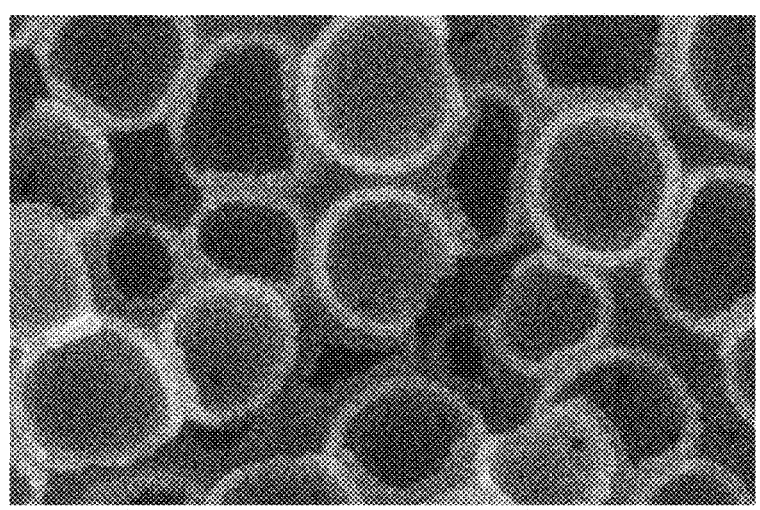
FIG. 3E is an enlarged view of FIG. 3D.

SEM images of the prepared silicon-porous carbon composite are shown in FIGS. 3D and 3E.

Preparation Example 2-3 (SMM1200)

1 g of the porous carbon structure of Preparation Example 1 was subjected to chemical deposition of $SiH_4$ (g) at 475° C. and at a rate of 50 sccm for 11 minutes to prepare a silicon-porous carbon composite.

Figure 3F:
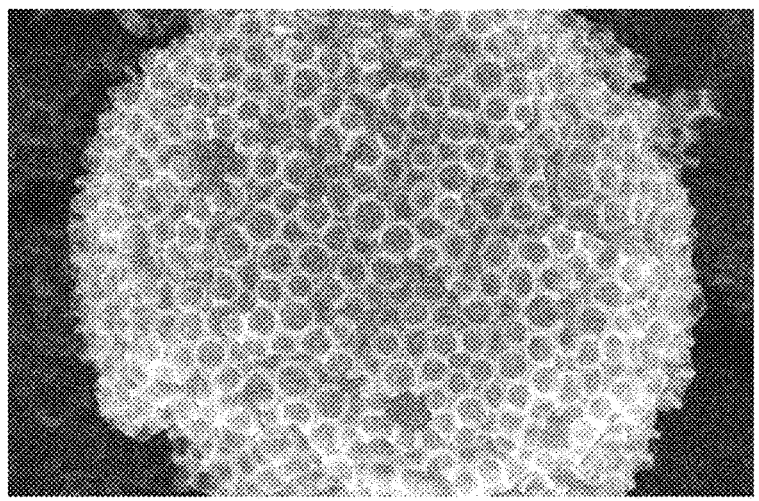
FIG. 3F is an SEM image of a silicon-porous carbon composite prepared according to Preparation Example 2-3.
Figure 3G:
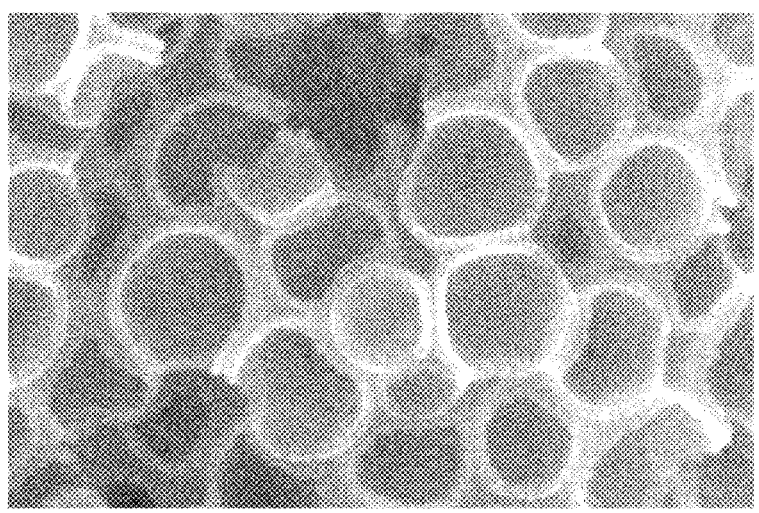
FIG. 3G is an enlarged view of FIG. 3F.

SEM images of the prepared silicon-porous carbon composite are shown in FIGS. 3F and 3G.

Preparation Example 2-4 (SMM2000)

1 g of the porous carbon structure of Preparation Example 1 was subjected to chemical deposition of $SiH_4$ (g) at 475° C. and at a rate of 50 sccm for 25 minutes to prepare a silicon-porous carbon composite.

Figure 3H:
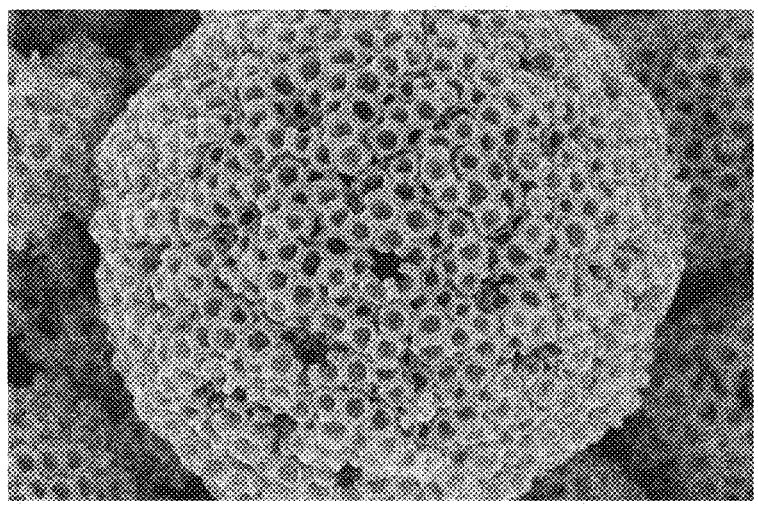
FIG. 3H is an SEM image of a silicon-porous carbon composite prepared according to Preparation Example 2-4.
Figure 3I:
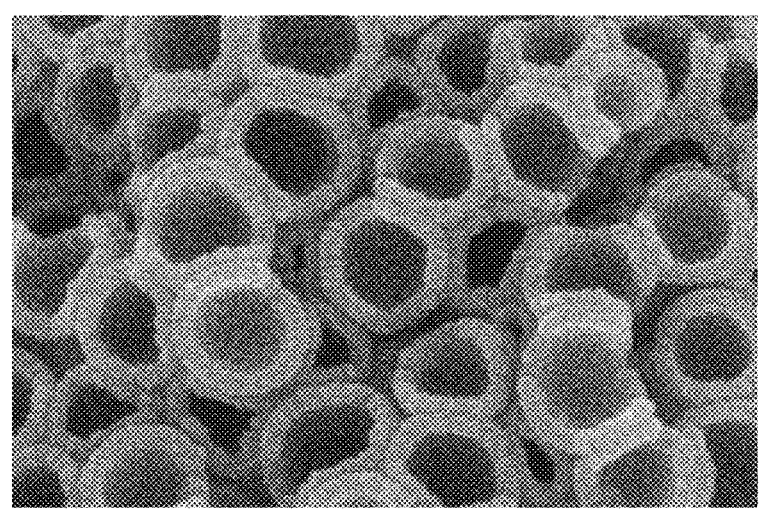
FIG. 3I is an enlarged view of FIG. 3H.

SEM images of the prepared silicon-porous carbon composite are shown in FIGS. 3H and 3I.

(Carbon-Silicon-Porous Carbon Composite)

Preparation Example 3-1

1 g of the silicon-porous carbon composite prepared according to Preparation Example 2-1 and 0.1 g of pitch were mixed in a dry mixer. The mixed sample was then heat-treated in a nitrogen atmosphere while being maintained at 900° C. for 1 hour to prepare a carbon-silicon-porous carbon composite.

Figure 4A:
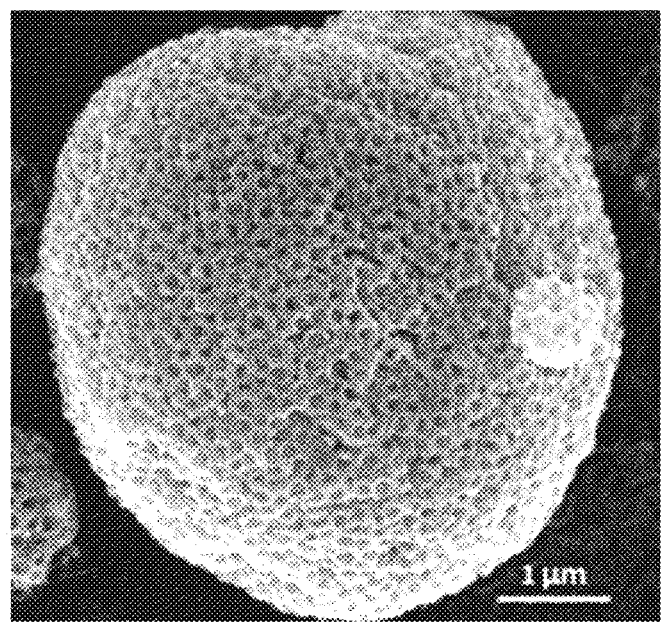
FIG. 4A is an SEM image of a carbon-silicon-porous carbon composite prepared according to Preparation Example 3-1.
Figure 4B:
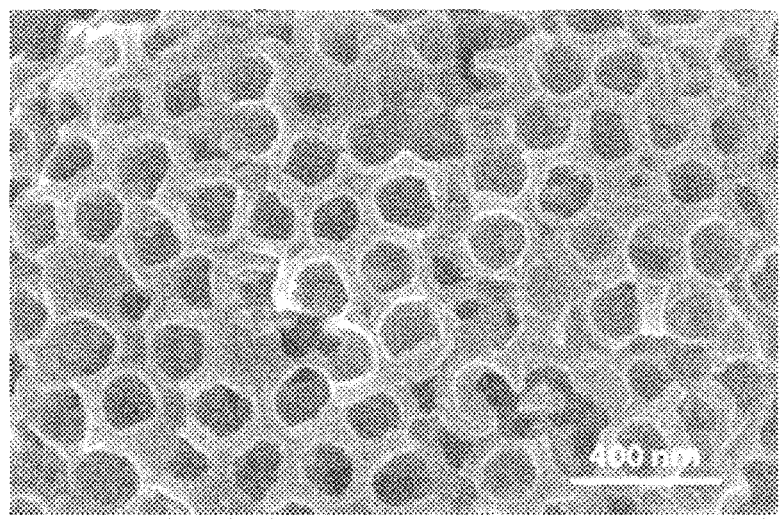
FIG. 4B is an enlarged view of FIG. 4A.
Figure 4C:
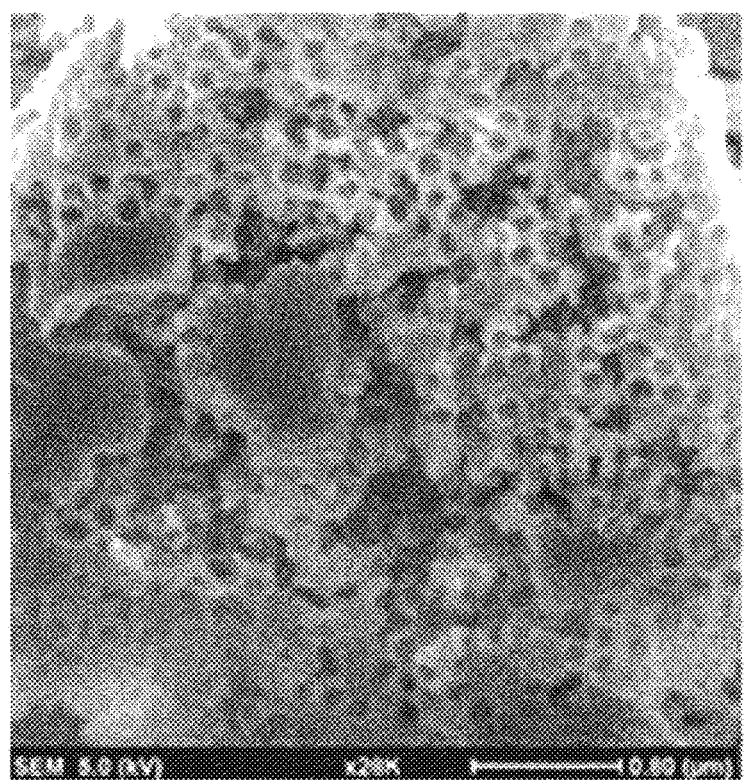
FIG. 4C is an SEM image of a cross-section of a carbon-silicon-porous carbon composite prepared according to Preparation Example 3-1.

SEM images of the prepared carbon-silicon-porous carbon composite are shown in FIGS. 4A to 4C.

Preparation Example 3-2 (CSMM600)

1 g of the silicon-porous carbon composite prepared according to Preparation Example 2-2 and 0.1 g of pitch were mixed in a dry mixer. The mixed sample was then heat-treated in a nitrogen atmosphere while being maintained at 900° C. for 1 hour to prepare a carbon-silicon-porous carbon composite.

Figure 4D:
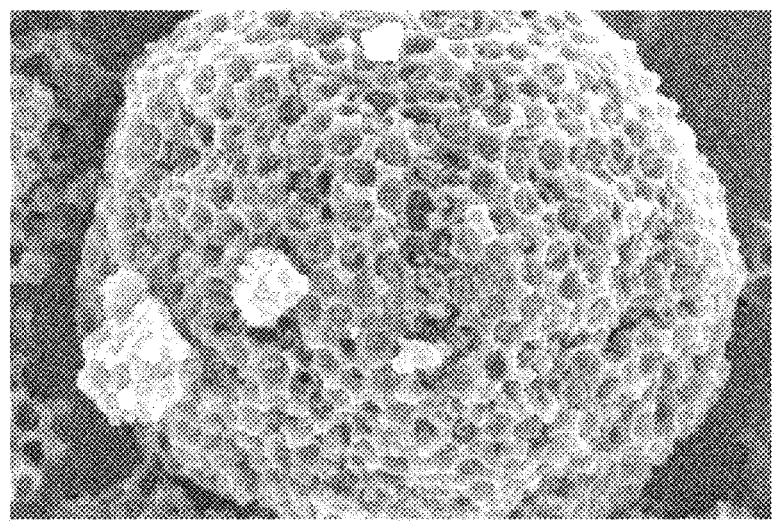
FIGS. 4D and 4E are SEM images of a carbon-silicon-porous carbon composite prepared according to Preparation Example 3-2.
Figure 4E:
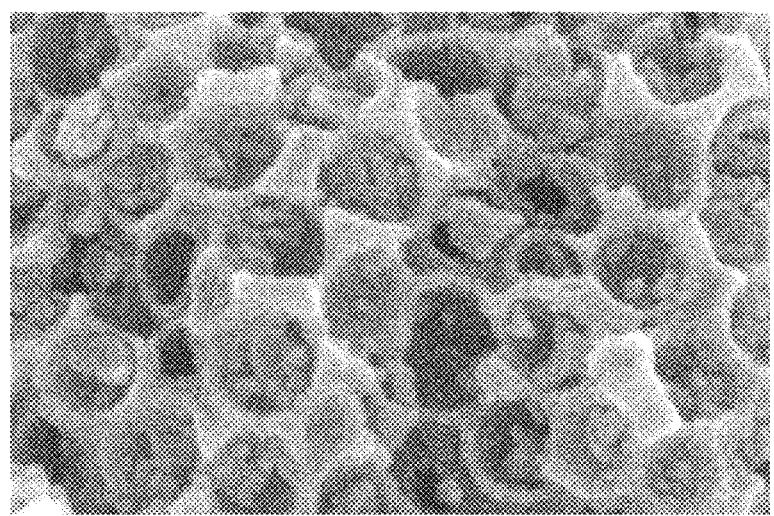
Figure 4F:
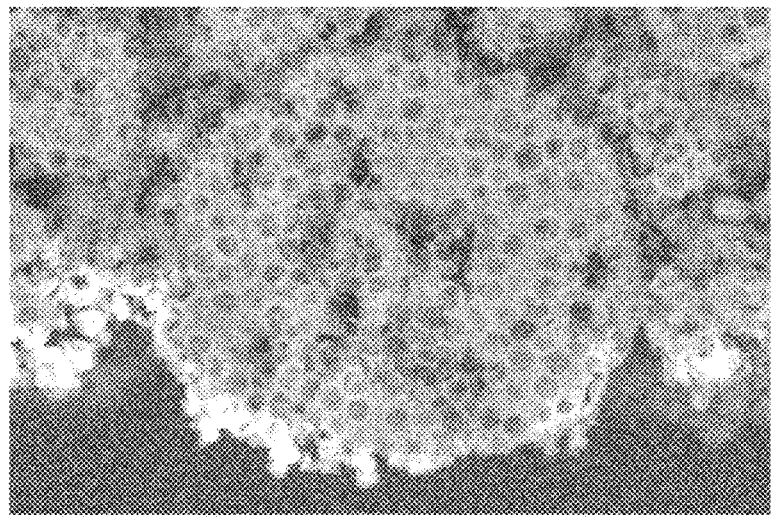
FIGS. 4F and 4G are images showing a cross-section of the carbon-silicon-porous carbon composite of Preparation Example 3-2.
Figure 4G:
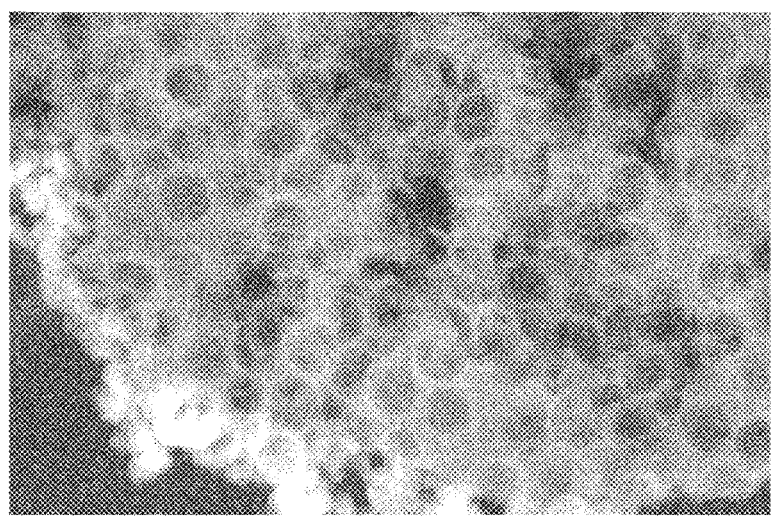

SEM images of the prepared carbon-silicon-porous carbon composite are shown in FIGS. 4D and 4E, and a cross-sectional image and an enlarged image thereof are shown in FIGS. 4F and 4G.

Preparation Example 3-3 (CSMM1200)

1 g of the silicon-porous carbon composite prepared according to Preparation Example 2-3 and 0.1 g of pitch were mixed in a dry mixer. The mixed sample was then heat-treated in a nitrogen atmosphere while being maintained at 900° C. for 1 hour to prepare a carbon-silicon-porous carbon composite.

Figure 4H:
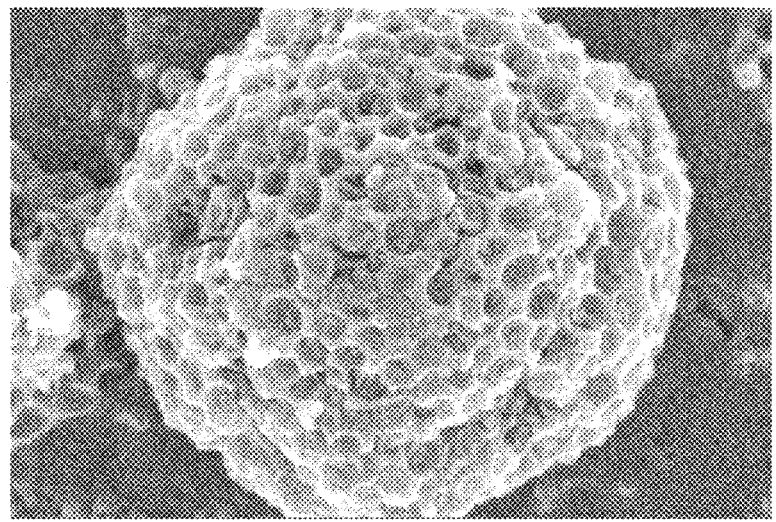
FIGS. 4H and 4I are SEM images of a carbon-silicon-porous carbon composite prepared according to Preparation Example 3-3.
Figure 4I:
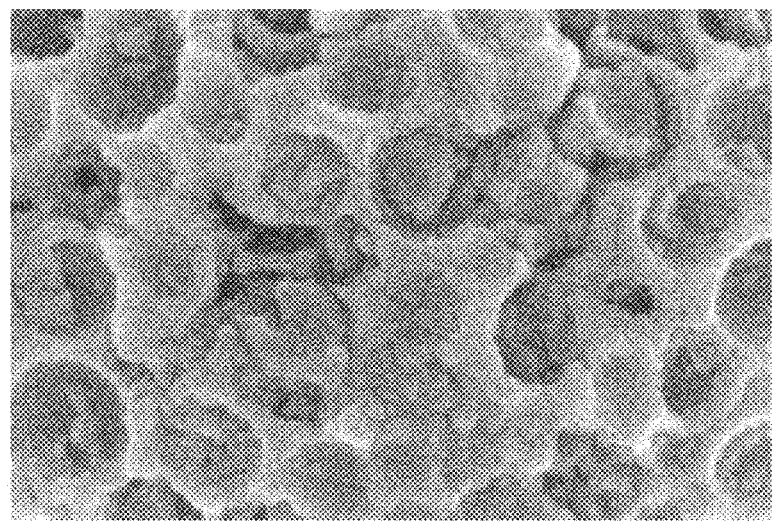
Figure 4J:
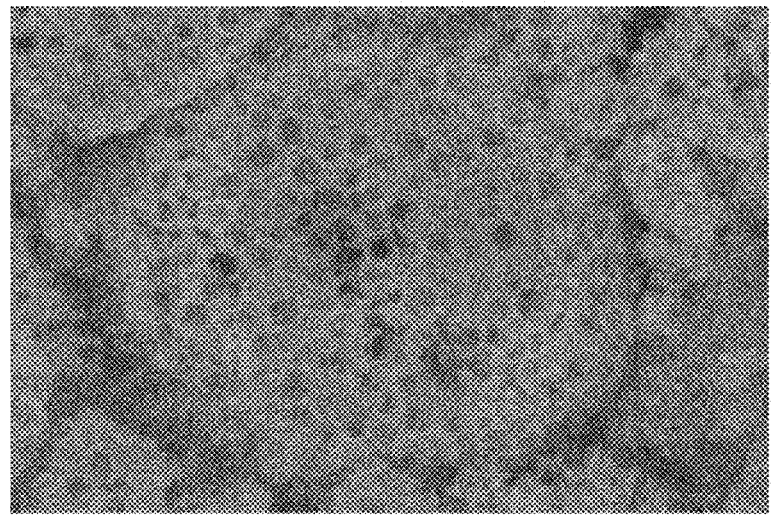
FIGS. 4J and 4K are images showing a cross-section of the carbon-silicon-porous carbon composite of Preparation Example 3-3.
Figure 4K:
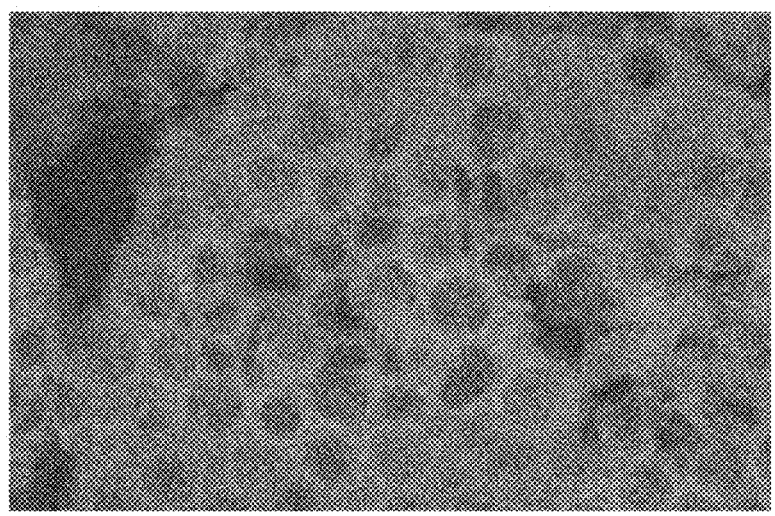

SEM images of the prepared carbon-silicon-porous carbon composite are shown in FIGS. 4H and 4I, and cross-sectional images thereof are shown in FIGS. 4J and 4K.

Preparation Example 3-4 (CSMM2000)

1 g of the silicon-porous carbon composite prepared according to Preparation Example 2-4 and 0.1 g of pitch were mixed in a dry mixer. The mixed sample was then heat-treated in a nitrogen atmosphere while being maintained at 900° C. for 1 hour to prepare a carbon-silicon-porous carbon composite.

Figure 4L:
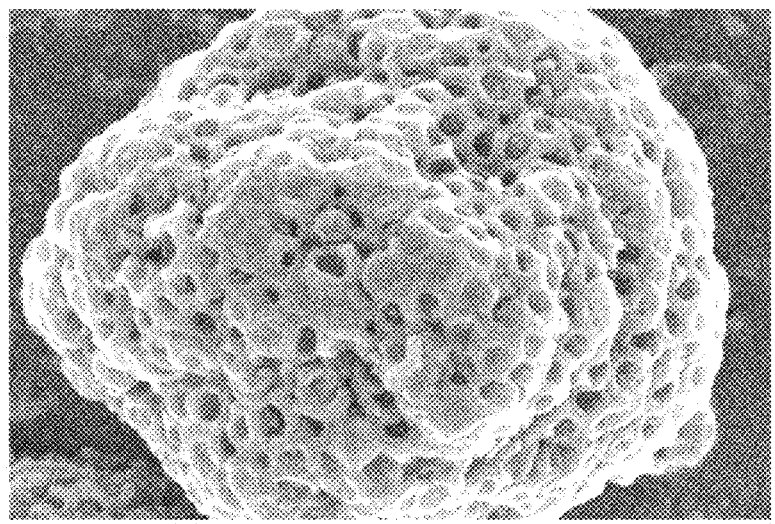
FIGS. 4L and 4M are SEM images of a carbon-silicon-porous carbon composite prepared according to Preparation Example 3-4.
Figure 4M:
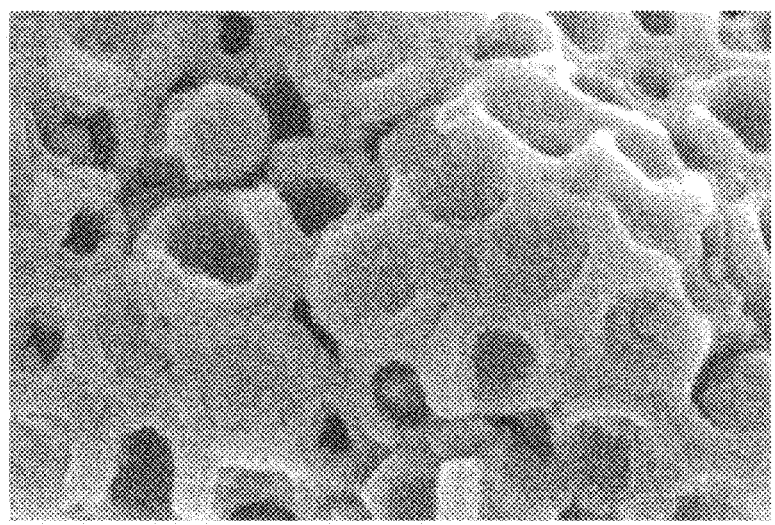
Figure 4N:
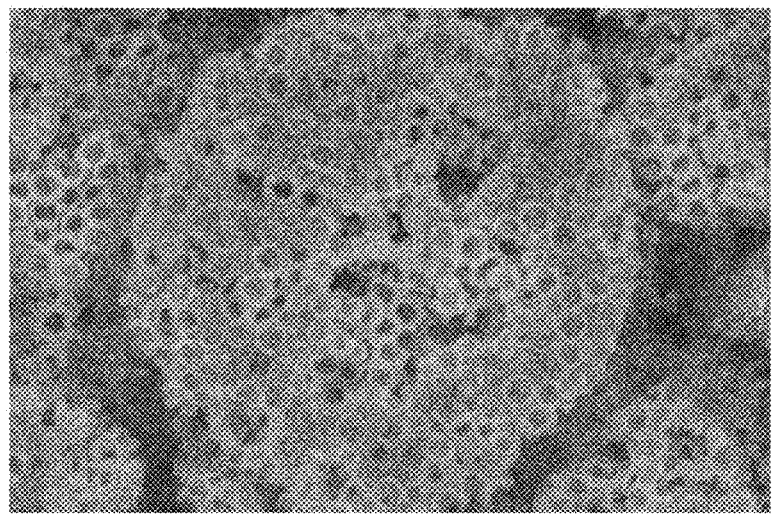
FIGS. 4N and 4O are images showing a cross-section of the carbon-silicon-porous carbon composite of Preparation Example 3-4.
Figure 4O:
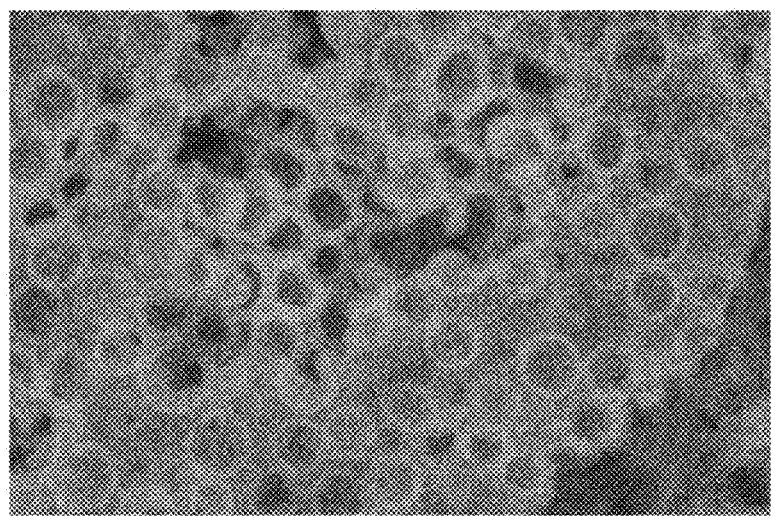

SEM images of the prepared carbon-silicon-porous carbon composite are shown in FIGS. 4L and 4M, and cross-sectional images thereof are shown in FIGS. 4N and 4O.

(Manufacture of Anode)

Example 1

The carbon-silicon-porous carbon composite prepared according to Preparation Example 3-1 as an anode active material, carbon black as a conductive agent, CMC as a thickener, and SBR as a binder were used in a ratio of 80:10:5:5 to prepare a slurry. The slurry was applied onto a copper current collector having a thickness of 18 μm using a general method. The slurry-applied current collector was dried at room temperature, subjected to secondary drying at 120° C. in a vacuum, roll-pressed, and punched, thereby completing the fabrication of an anode to be applied to a cell.

Examples 2 to 4

Anodes were manufactured in the same manner as in Example 1, except that the carbon-silicon-porous carbon composites prepared according to Preparation Examples 3-2 to 3-4 were respectively used as an anode active material.

Comparative Example 1

An anode was manufactured in the same manner as in Example 1, except that the porous carbon composite of Preparation Example 1 was used as an anode active material.

Comparative Example 2

An anode was manufactured in the same manner as in Example 1, except that silicon nanoparticles were used as an anode active material.

(Manufacture of Half-Cell)

Example 5

A separator was located between the anode manufactured according to Example 1 and Li foil as a counter electrode, and a liquid electrolytic solution was injected into the resulting structure, thereby completing the manufacture of a CR2032 coin-type half-cell.

A porous polyethylene film was used as the separator.

The liquid electrolytic solution was prepared by adding 10 wt % of fluorinated ethylene carbonate (FEC) to a mixed solvent of ethylene carbonate (EC) and diethyl carbonate (DEC) in a volume ratio of 3:7 and dissolving 1.3 M $LiPF_6$ in the resulting solution.

Examples 6 to 8

Coin-type half-cells were manufactured in the same manner as in Example 5, except that the anodes manufactured according to Examples 2 to 4 were respectively used instead of the anode of Example 1.

Comparative Example 3

A coin-type half-cell was manufactured in the same manner as in Example 5, except that the anode manufactured according to Comparative Example 1 was used instead of the anode of Example 1.

Comparative Example 4

A coin-type half-cell was manufactured in the same manner as in Example 5, except that the anode manufactured according to Comparative Example 2 was used instead of the anode of Example 1.

Evaluation Example 1: Evaluation of Charge/Discharge Characteristics (1)

Figure 5:
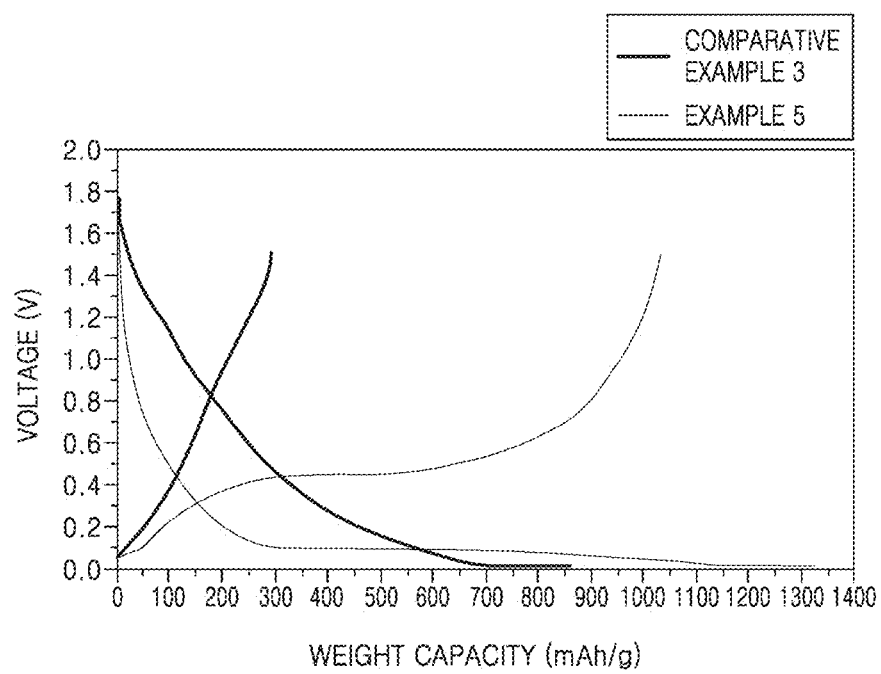
FIG. 5 is a graph showing charge/discharge curves of half-cells manufactured according to Example 5 and Comparative Example 3.
Figure 6:
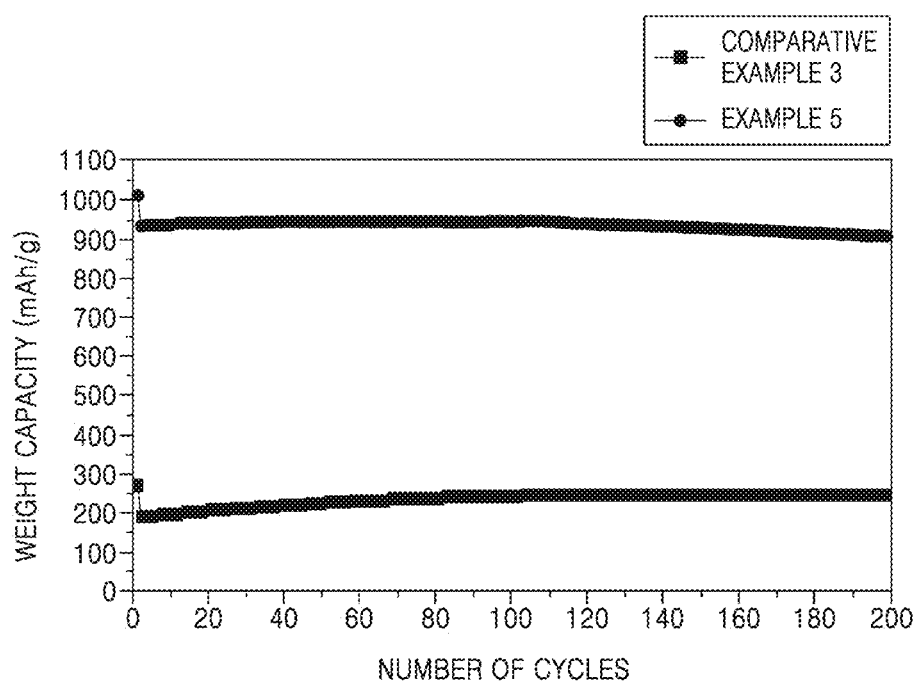
FIG. 6 is a graph showing the cycle lifespan of each of the half-cells of Example 5 and Comparative Example 3.
Figure 8:
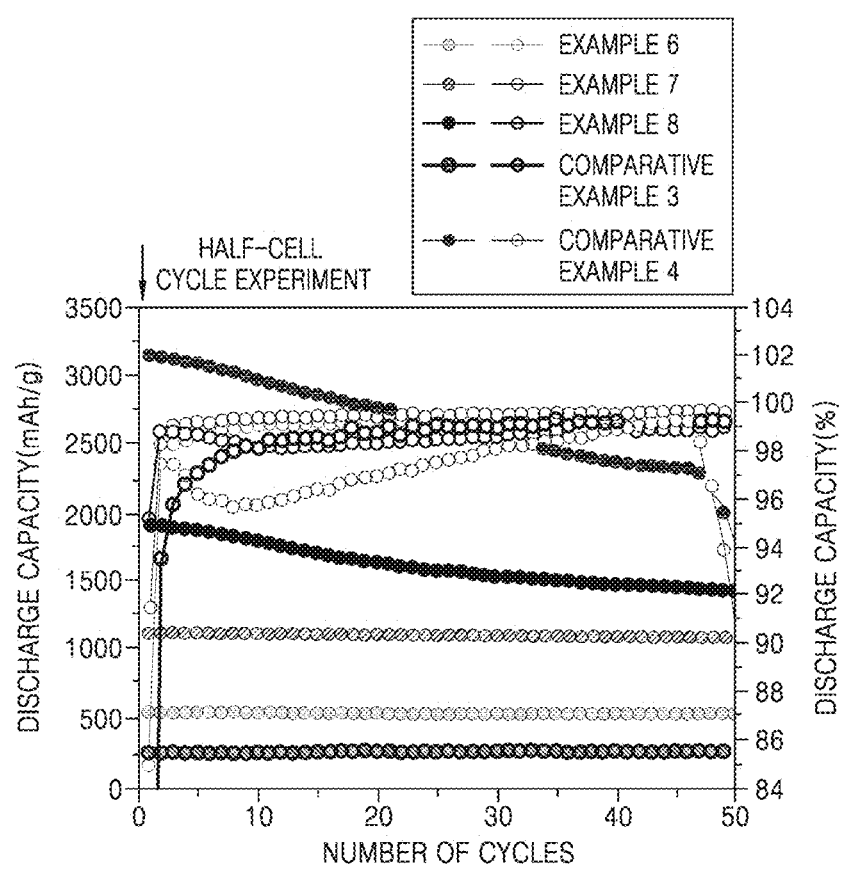
FIG. 8 is a graph showing the cycle lifespan of each of the half-cells of Examples 6 to 8 and Comparative Examples 3 and 4.

Each of the half-cells manufactured according to Example 5 and Comparative Example 3 started to be charged at 25° C. at a charge rate of 0.1 C-rate until the voltage reached 0.01 V such that charging was performed at a constant current until the voltage reached a certain voltage, and then performed at a constant voltage until the current reached a certain current (0.01 C) or less. Subsequently, each half-cell was discharged at a constant current of 0.1 C-rate until the voltage reached 1.5 V. After this cycle of charging and discharging was performed twice, 200 cycles of charging and discharging were consecutively performed at a charge/discharge rate of 0.5 C-rate and at a voltage ranging from 0.01 V to 1.5 V. Some of the charge/discharge experimental results are shown in Table 1 below, and a graph and a cycle lifespan graph of the charge/discharge experimental results are shown in FIGS. 5 and 8.

Initial efficiency and capacity retention ratio were respectively calculated by Equations 1 and 2 below.

Initial efficiency [%]=[discharge capacity at $1^{st}$ cycle/charge capacity at $1^{st}$ cycle]×100    <Equation 1>

Capacity retention ratio [%]=[discharge capacity at $50^{th}$ cycle/discharge capacity at $1^{st}$ cycle]×100    <Equation 2>

TABLE 1

| | Initial efficiency [%] | Capacity retention ratio [%] |
|---|---|---|
| Example 5 | 78 | 93.2 |
| Comparative Example 3 | 34 | 78.3 |

As can be seen from Table 1, it is confirmed that the half-cell (Example 5) including a composite anode active material including the carbon-silicon-porous carbon composite of the present disclosure has excellent initial efficiency and excellent lifespan characteristics, compared to those of the half-cell (Comparative Example 3) including an anode active material including the porous carbon composite.

Evaluation Example 2: Formation Voltage Profile

Figure 7:
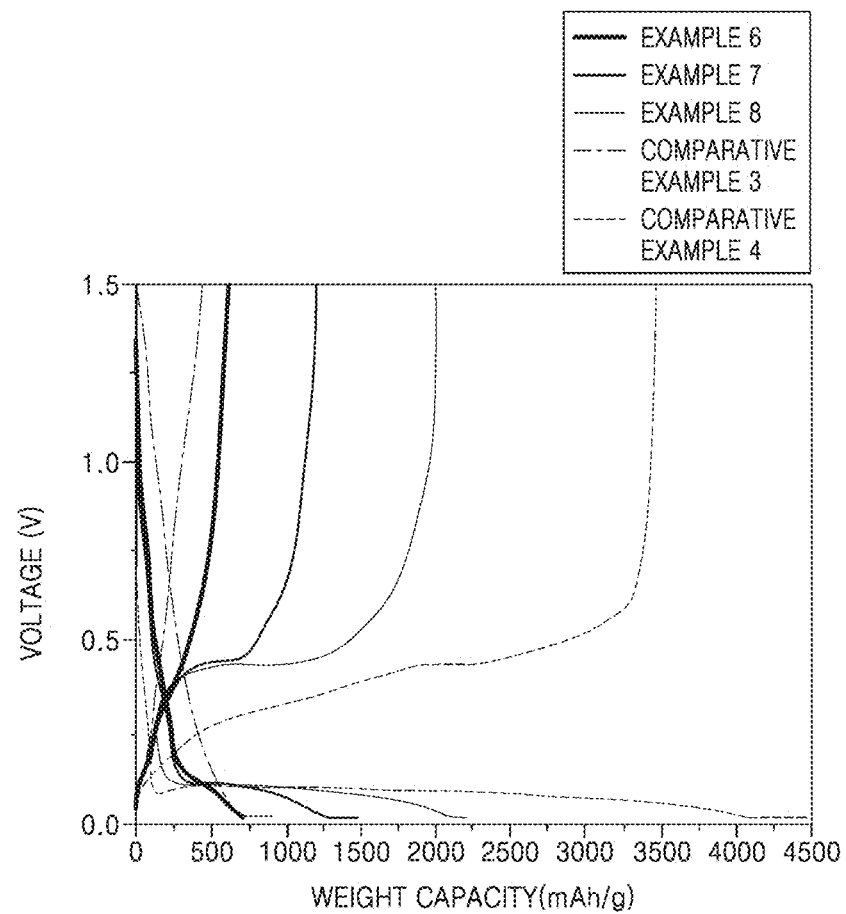
FIG. 7 is a graph showing initial charge/discharge curves of half-cells manufactured according to Examples 6 to 8 and Comparative Examples 3 and 4.

Weight capacity with respect to voltage of each of the half-cells manufactured according to Examples 6 to 8 and Comparative Examples 3 and 4 after charging and discharging of initial formation was measured, and results thereof are illustrated in FIG. 7.

Referring to FIG. 7, it can be seen that the anode active material used in Example 6 has a reversible capacity of about 600 mAh/g, the anode active material used in Example 7 has a reversible capacity of about 1,200 mAh/g, and the anode active material used in Example 8 has a reversible capacity of about 2,000 mAh/g. In contrast, it can be seen that the anode active material used in Comparative Example 3 merely has a reversible capacity of about 400 mAh/g, and the anode active materials used in Examples 6 to 8 of the present disclosure have excellent capacity. Although the anode active material used in Comparative Example 4 has a reversible capacity of about 3,400 mAh/g, which is a higher capacity than that of the anode active materials used in Examples 6 to 8, as described below, the case of Comparative Example 4 exhibits significantly deteriorated lifespan characteristics during charging and discharging.

Evaluation Example 3: Evaluation of Charge/Discharge Characteristics (2)

An experiment was performed on each of the half-cells of Examples 6 to 8 and Comparative Examples 3 and 4 using the same method as that used in Evaluation Example 1, and the results thereof are shown in Table 2 below and FIG. 8.

TABLE 2

| | Initial efficiency [%] | Capacity retention ratio [%] |
|---|---|---|
| Example 6 | 73.5 | 98.6 |
| Example 7 | 83.3 | 96.5 |
| Example 8 | 91.2 | 74.9 |
| Comparative Example 3 | 48.6 | 98.5 |
| Comparative Example 4 | 78.0 | 54.7 |

As shown in Table 2 and FIG. 8, the half-cells of Examples 6 and 7 exhibited the same capacity retention ratio as that of the half-cell of Comparative Example 3, and the half-cells of Examples 6 to 8 exhibited significantly enhanced capacity retention ratio compared to the half-cell of Comparative Example 4. That is, the cases of Examples 6 to 8 each including the carbon-silicon-porous carbon structure as an anode active material exhibited an increase in total capacity through introduction of silicon, and achieved the same capacity retention ratio as that of the case of Comparative Example 3 including only the carbon structure.

Evaluation Example 4: Evaluation of Rate Characteristics

Figure 9:
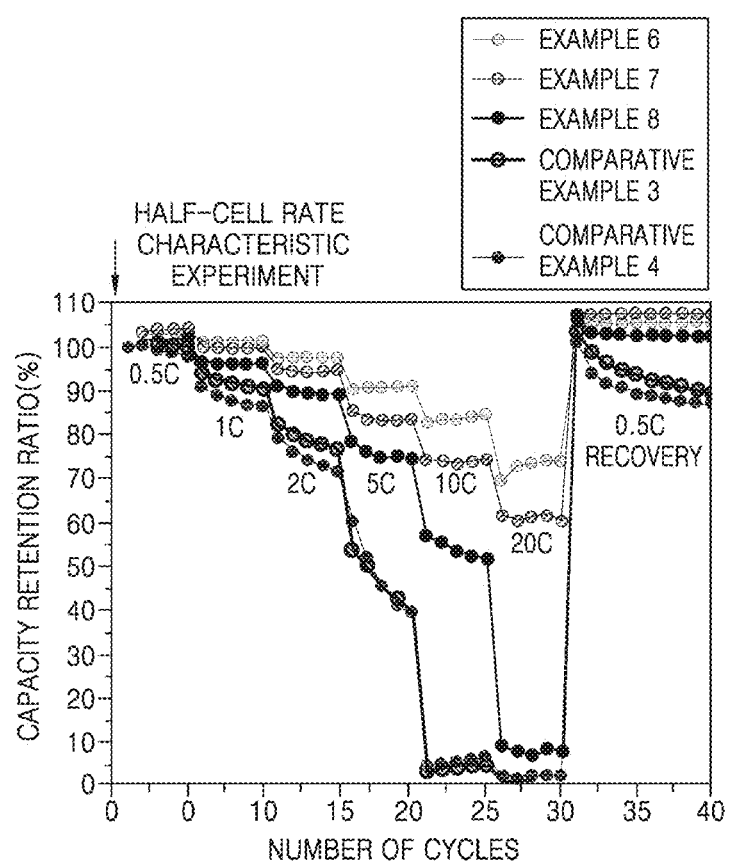
FIG. 9 is a graph showing rate characteristics of the half-cells of Examples 6 to 8 and Comparative Examples 3 and 4.
Figure 10:
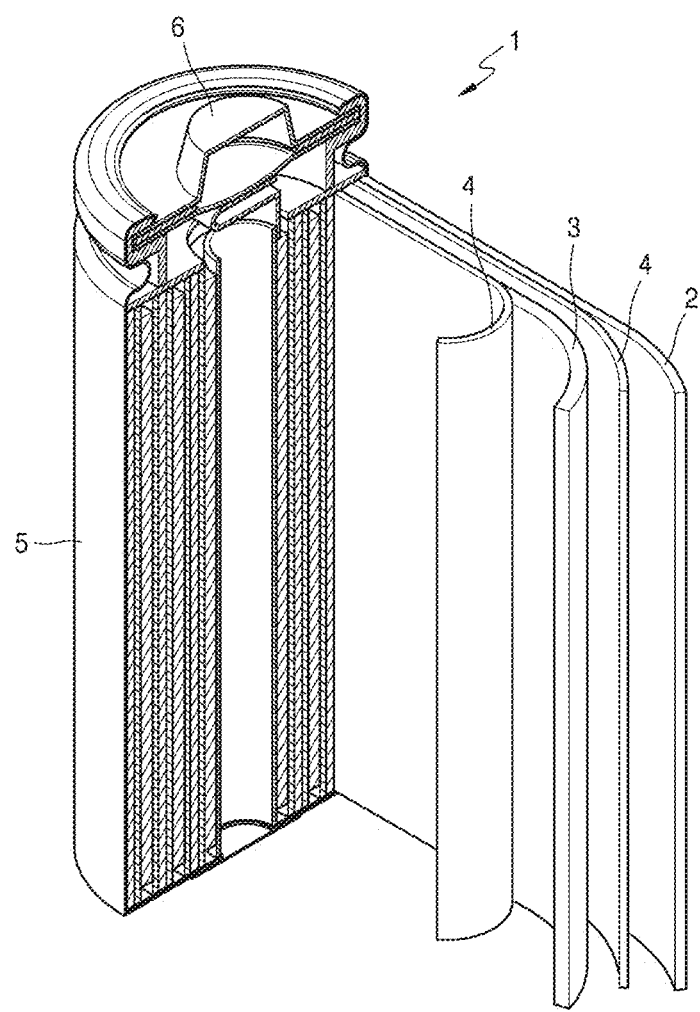
FIG. 10 is a view of a lithium battery according to an example embodiment.

Rate characteristics of the half-cells of Examples 6 to 8 and Comparative Examples 3 and 4 were evaluated while cycles of charging and discharging were performed according to rate (0.5 C, 1 C, 2 C, 5 C, 10 C, and 20 C), and the results thereof are illustrated in FIG. 9. In a graph illustrated in FIG. 9, x axis denotes the number of cycles, and y axis denotes a capacity retention ratio. A capacity retention ratio refers to a decrease in capacity with respect to initial reversible capacity.

Referring to FIG. 9, it can be confirmed that the half-cells of Examples 6 to 8 generally exhibit enhanced lifespan characteristics compared to the half-cell of Comparative Example 4. In particular, it can be confirmed that the half-cell of Example 7 has a capacity retention ratio of greater than 50% in $20^{th}$ to $25^{th}$ cycles at 10 C, which shows a stark contrast to the half-cell of Comparative Example 4, the capacity retention ratio of which was decreased to about 5%. In addition, it can be confirmed that the half-cell of Example 6 exhibits a capacity retention ratio of about 60% even at a high rate, i.e., 20 C, which indicates excellent high-rate characteristics.

As is apparent from the foregoing description, a composite anode active material includes a first coating layer on a surface of a porous carbon structure and including a non-carbonaceous material capable of intercalating and deintercalating lithium and a second coating layer on the first coating layer and including a carbonaceous material, and a lithium secondary battery including an anode including the composite anode active material has high capacity, high efficiency, and excellent lifespan characteristics.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A method of preparing a composite anode active material, the method comprising:
spray-drying a solution including a carbon source and a pore-forming agent to obtain a composite structure;
etching the composite structure to form a porous composite structure;
providing a non-carbonaceous material to the porous composite structure to form a first coating layer on a surface of the porous composite structure; and
providing a carbon precursor to the first coating layer to form a second coating layer comprising a carbonaceous material on the first coating layer arranged on the surface of the porous composite,
wherein the pore-forming agent is a silicon oxide, and
wherein the porous composite structure has a plurality of pores, and the pores have an average pore diameter of about 200 nm to about 300 nm.

2. The method of claim 1, further comprising, after the spray-drying and before the etching, sintering the composite structure in a nitrogen atmosphere.

3. The method of claim 1, wherein in the etching, the composite structure is etched by a sodium hydroxide (NaOH) solution.

4. The method of claim 1, wherein the non-carbonaceous material is a silane.

5. The method of claim 1, wherein the carbon precursor comprises at least one selected from the group consisting of rayon-based carbon fibers, PAN-based carbon fibers, pitch-based carbon fibers, vapor-grown carbon, carbon fibers, graphite, coal tar pitch, petroleum pitch, meso-phase pitch, an isotropic pitch, cokes, and a coal-based pitch.

6. The method of claim 1, wherein the providing of the non-carbonaceous material to the porous composite structure comprises performing heat treatment at a temperature ranging from about 450° C. to about 600° C.

7. The method of claim 1, wherein the providing of the carbon precursor to the first coating layer comprises performing heat treatment at a temperature ranging from about 700° C. to about 900° C.

* * * * *